(No Model.)
H. & J. KASSEN.
COFFEE BOILER.
No. 279,649. Patented June 19, 1883.
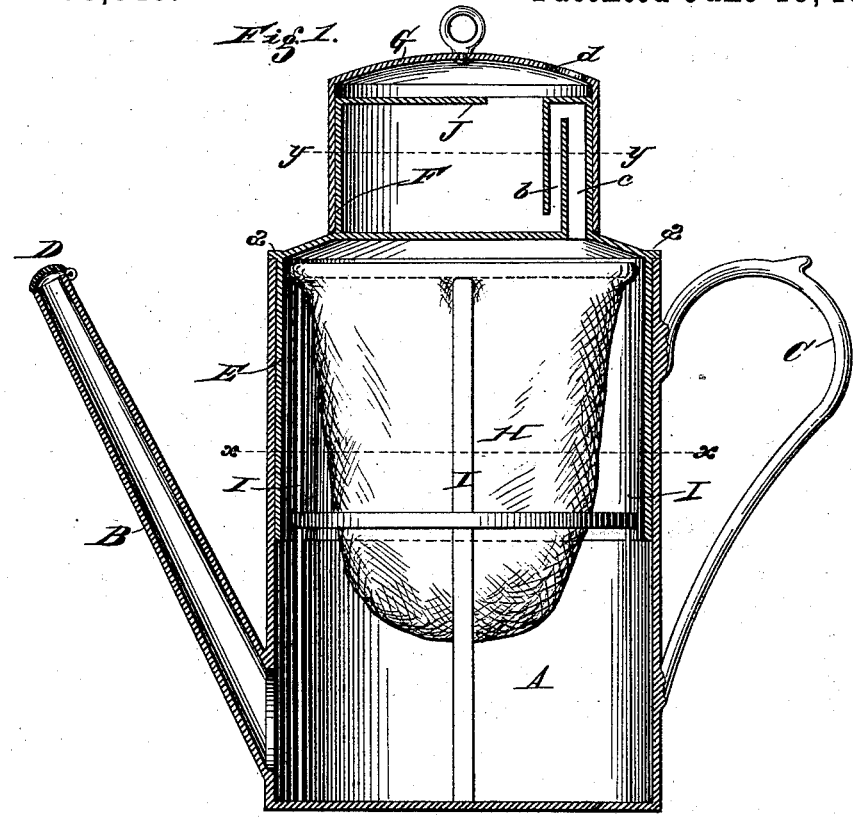
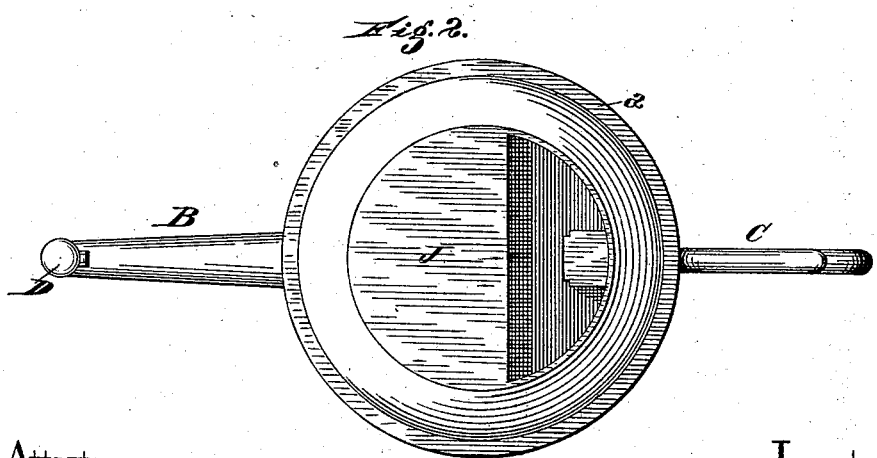
Attest,
Jno. E. Wiles
Ed. W. Reitor
Inventors,
Henry Kassen & John Kassen
by Stuart Peck
Attorneys &c.

UNITED STATES PATENT OFFICE.

HENRY KASSEN AND JOHN KASSEN, OF CINCINNATI, OHIO.

COFFEE-BOILER.

SPECIFICATION forming part of Letters Patent No. 279,649, dated June 19, 1883.

Application filed April 4, 1883. (No model.)

*To all whom it may concern:*

Be it known that we, HENRY KASSEN and JOHN KASSEN, citizens of the United States, residing at Cincinnati, in the county of Hamilton and State of Ohio, have invented certain new and useful Improvements in Coffee-Boilers, of which the following is a full, clear, and exact description, reference being had to the accompanying drawings, making a part of this specification.

The object of our invention is to provide a simple, cheap, and efficient coffee-boiler, by means of which, in boiling coffee, its richness and aroma are preserved, and the steam, which would ordinarily escape and carry off with it more or less of the volatile essences of the coffee, is retained and prevented from escaping into the room.

The novelty consists in the construction and combination of the parts, as will be herewith set forth and specifically claimed.

In the accompanying drawings, Figure 1 is a central sectional view, in elevation, of our improved coffee-boiler. Fig. 2 is a top or plan view with the cover of the pan removed.

A is any suitable vessel, preferably cylindrical, with an open top, and provided with a pouring-spout, B, and handle C. The end of the spout may be provided with a hinged valve or cover, D, as is customary.

Into the top of the vessel A is fitted a removable cylinder, E, with a flange, $a$, resting upon the top of the vessel A. This cylinder has upon its top a somewhat smaller vessel or pan, F, over which is fitted any suitable removable cover, G, as shown. The coffee to be boiled is placed in a muslin or other textile sack or bag, H, supported upon a frame or tripod, I, which fits in and rests upon the bottom of the vessel A, as shown. The lower edge of the cylinder E descends far enough into the vessel A to be below the water-line, (represented by the dotted line $x$ $x$,) and communication is had between the vessel A and the pan F by means of the double tubes $b$ $c$, the latter of which extends from an opening in the bottom of the pan to the top of the same, and has communication with the down-tube $b$, which has an outlet-opening at the bottom of the pan.

Across the top of the pan extends a ledge, J, the object of which will be presently explained, and the cover G has an air-vent, $d$, through which air can enter the vessel A during the act of pouring out the coffee.

The pan F should be about half filled with water—say to the point represented by the dotted line $y$ $y$—or far enough up to seal the lower opening of the tube $b$. In putting the vessel together the ground coffee in the sack would be first placed in the vessel A and the proper amount of water added. Then in placing on the pan F, with its cylinder E, care should be taken to bring the tubes $b$ $c$ to the rear, or next to the handle. This would bring the ledge J to the front, or next to the spout, and in putting on the cover G the air-vent $d$ should be over the tubes $b$ $c$. Now, during the boiling of the coffee the generated steam could only escape through the trap-tubes $b$ $c$, and would have to enter the water in the pan F, where it would be condensed and be prevented from escaping into the room, and when the vessel is tilted to pour out the coffee the water in the pan F would be caught and retained by the ledge J and prevented from coming in contact with the cover G. At the same time, the tube $b$ being unsealed, air would enter through the vent $d$ and find its way into the vessel A. The ledge J covers but little more than one-half of the pan, so that free access is given to the same when it is desired to clean it.

Having thus fully described our invention, we claim—

The herein-described coffee-boiler, consisting of the vessel A, with its handle and spout, and contained textile bag or sack H, supported upon the frame I, the cylinder E, fitting within the vessel A, with its lower edge extending below the water-line, and carrying upon its top the water-pan F, provided with the tubes $b$ $c$, arranged next to the handle, and with the ledge J, arranged next to the spout, said water-pan having a cover, G, with vent $d$, arranged over the tubes $b$ $c$, the whole constructed substantially in the manner and for the purpose specified.

HENRY KASSEN.
JOHN KASSEN.

Witnesses:
GUS A. MEYER,
EDWARD W. RECTOR.